United States Patent [19]
Reed

[11] Patent Number: 5,731,781
[45] Date of Patent: Mar. 24, 1998

[54] CONTINUOUS WAVE WIDEBAND PRECISION RANGING RADAR

[75] Inventor: John Christopher Reed, Tucson, Ariz.

[73] Assignee: Delco Electronics Corp., Kokomo, Ind.

[21] Appl. No.: 650,283

[22] Filed: May 20, 1996

[51] Int. Cl.$^6$ ................................................. G01S 13/34
[52] U.S. Cl. ........................... 342/135; 342/145; 342/70
[58] Field of Search ................................ 342/70, 71, 72, 342/135, 145

[56] References Cited

U.S. PATENT DOCUMENTS

| | | | |
|---|---|---|---|
| 3,774,206 | 11/1973 | Rauch | 342/89 |
| 4,042,925 | 8/1977 | Albanese et al. | 342/132 |
| 4,184,154 | 1/1980 | Albanese et al. | 342/107 |
| 4,206,462 | 6/1980 | Rabow et al. | 342/60 |
| 5,063,560 | 11/1991 | Yerbury et al. | 370/18 |
| 5,258,996 | 11/1993 | Fraser et al. | 375/1 |
| 5,258,997 | 11/1993 | Fraser et al. | 375/1 |

FOREIGN PATENT DOCUMENTS

| | | | |
|---|---|---|---|
| 0 714035A1 | 5/1996 | European Pat. Off. | G01S 13/34 |
| 2 580 080 | 10/1986 | France | G01S 13/32 |
| 62-093677 | 4/1987 | Japan | G01S 13/32 |
| 05256936 | 10/1993 | Japan | G01S 13/32 |
| 08146126 | 6/1996 | Japan | G01S 13/28 |
| 08279801 | 10/1996 | Japan | H04J 13/00 |
| 2 259 820 A | 3/1993 | United Kingdom | G01S 13/36 |

OTHER PUBLICATIONS

Principles of Communication System. By Herbert Taub and Donald L. Schilling. Chapter Seventeen—Spread Spectrum Modulation pp. 720–729.

1992 IEEE MTT-S International Microwave Symposium Digest. "Millimetre Wave Radars for Automotive Applications," by D. A. Williams. pp. 721–724.

*Primary Examiner*—John B. Sotomayor
*Attorney, Agent, or Firm*—Mark A. Navarre

[57] ABSTRACT

A precision ranging radar system for use in parking and backup maneuvers by drivers of vehicles to avoid collisions. The radar system includes a noise code generator for generating a noise code, a data source for generating a data bit stream, and a local oscillator microwave source. A data mixing mechanism is coupled to the noise code generator and data source for embedding data derived from the data source into the noise code. Transmit and receive microwave antennas are provided. A transmit phase modulator is coupled to the data mixing mechanism, the local oscillator microwave source, and the transmit antenna. A receive phase modulator is coupled to the local oscillator microwave source, and a code delay unit is coupled to the noise code generator and the receive phase modulator. A downconverter mixer is coupled to the receive microwave antenna and to the receive phase modulator, and a baseband integrator and amplifier is coupled to the downconverter mixer for outputting data from the radar system.

7 Claims, 4 Drawing Sheets

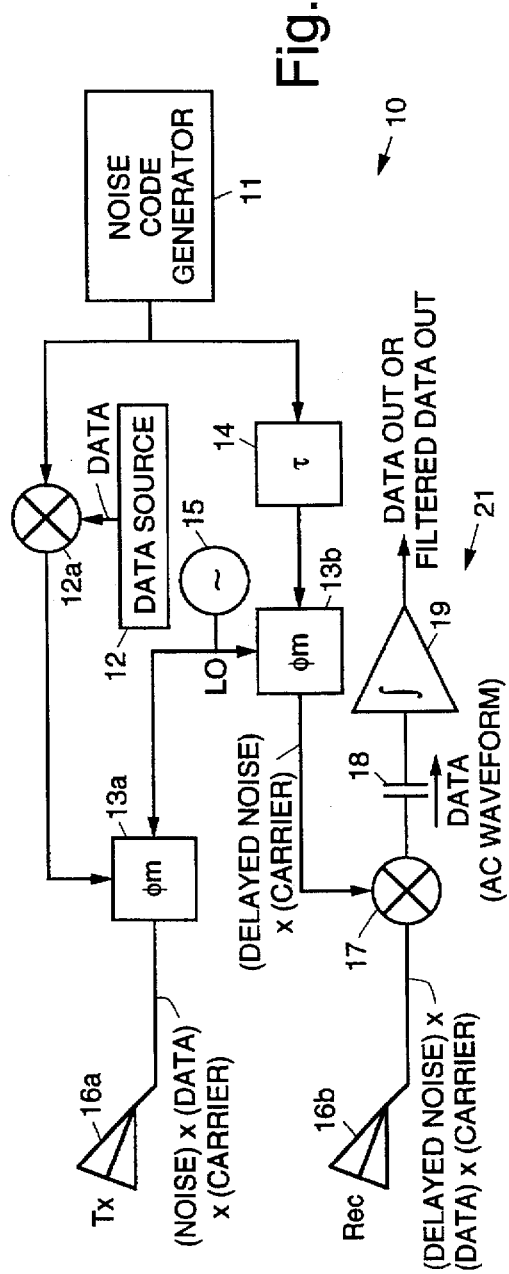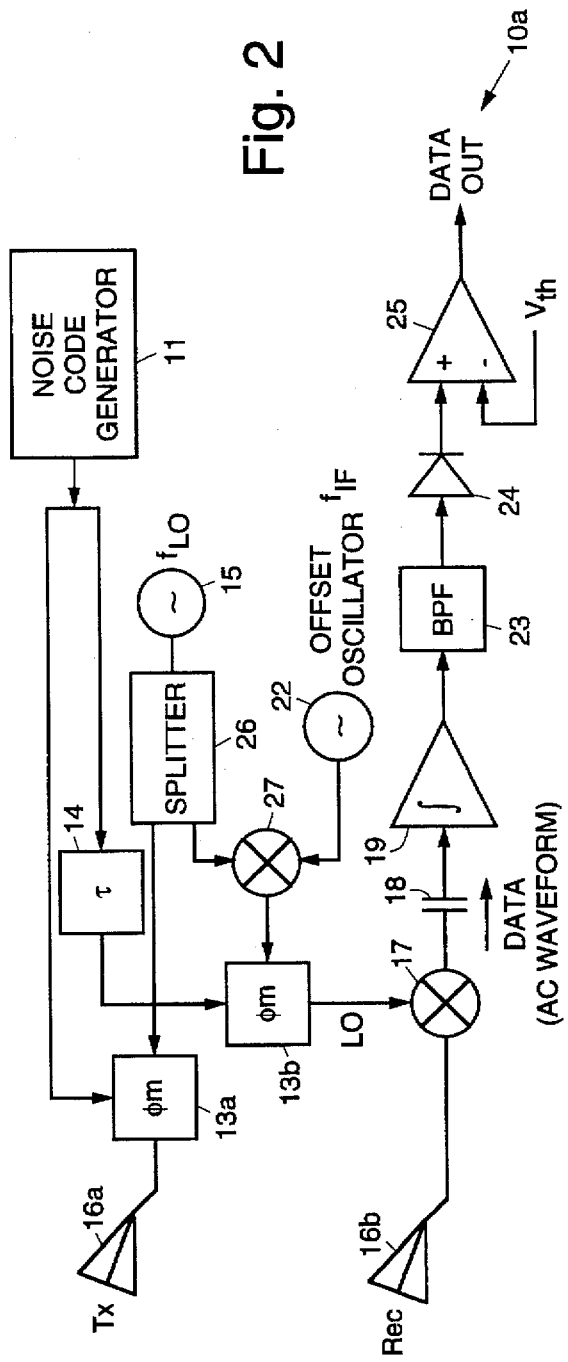

CONTINUOUS WAVE WIDEBAND PRECISION RANGING RADAR

BACKGROUND

The present invention relates generally to radar systems, and more particularly, to a continuous wave wideband precision ranging radar system.

There is no known highly analogous prior art relating to the present invention, but there is a great deal of similar prior art. Ranging techniques used in the global positioning system (GPS), where code delay measurements are used to determine range, are similar to the range measurement technique used in the present invention. However, the present invention provides more than the use of known techniques in a new application; the techniques are used in a novel way. The following is a discussion of prior art that is similar to the present invention.

Spread spectrum communications systems are well developed, with numerous combinations of implementation techniques in place. The most familiar example is the cellular telephone, where spread spectrum techniques are used extensively. The present invention is similar to spread spectrum direct sequence binary phase shift key communications links, where synchronization is the solution in the present invention and the problem in the communications system case. In the present invention, when there is a target in a detection range bin, reference and input signal are synchronized, correlator output becomes large, and the presence of the output indicates the presence of a target, in that a detection occurs. In the communications system case, a delay unit is commanded to vary a code delay (and local oscillator carrier phase) until synchronization occurs, indicated by the presence of data, whereafter the data is received and interpreted. Ranging information is not transferred or extracted in the communications system case, the noise codes are used for other purposes.

There are numerous examples of ranging systems that use the delay between received and reference noise codes to measure the distance between transmitting and receiving units. This technique is widely used in navigation systems, the most prevalent example of which is the global positioning system (GPS). The global positioning system uses multiple precise measurements of noise code delays in computing receiver coordinates. All of the known ranging systems do not have collocated transmitter and receiver. They are designed to measure the distance between the transmitter and receiver, as opposed to a CW precision radar which is designed to measure the distance between the radar and various objects. Code and carrier acquisition in the receiver represent challenges that are met by sophisticated techniques in the ranging systems, all of which are not necessary in the present invention since the reference and received code are both generated by the same circuit.

There are numerous pulse compression radar systems that use bi-phase or poly-phase shift key modulation within a short duration microwave energy pulse to further enhance the range resolution of the system beyond that supported by the unmodulated pulse. The phase modulation is rapid, and the chip length is short relative to the pulse length, to maximize range resolution. Typically the phase modulation is implemented using a maximal linear pseudo noise code. These systems are pulse radar systems, not CW radar systems, and thus are distinctly different than the present invention. The pulse compression techniques used in the prior art do not compare the time delay shift between reference and received codes, rather a pseudo noise code is used to compress the time duration of the received pulse to a fraction of that which was radiated. In these systems, the presence of the pseudo noise or noise codes are to enhance range resolution, not to directly measure range by code delay shifts.

Accordingly, it is an objective of the present invention to provide for an improved continuous wave wideband precision ranging radar system.

SUMMARY OF THE INVENTION

To meet the above and other objectives, the present invention provides for a precision ranging radar for use in parking and backup maneuvers by drivers of vehicles to avoid collisions. The present invention is a low cost radar system that provides precision ranging, while utilizing low radiated emissions power in short range applications. The radar system exhibits the target detection efficiency of continuous wave operation and the range precision of short time duration pulse radar. The radar system is designed to detect targets whether they are moving or stationary with respect to the radar with high sensitivity. For these reasons, there are numerous precision ranging applications for the present radar system. More particularly, in a basic embodiment, the present invention is a continuous wave wideband precision ranging radar system that includes a noise code generator for generating a noise code, a data source for generating a data bit stream, and a local oscillator microwave source. A data mixing mechanism is coupled to the noise code generator and data source for embedding data derived from the data source into the noise code. Transmit and receive microwave antennas are provided. A transmit phase modulator is coupled to the data mixing mechanism, the local oscillator microwave source, and the transmit antenna. A receive phase modulator is coupled to the local oscillator microwave source, and a code delay unit is coupled to the noise code generator and the receive phase modulator. A downconverter mixer is coupled to the receive microwave antenna and to the receive phase modulator, and a baseband integrator and amplifier is coupled to the downconverter mixer for outputting data from the radar system.

The CW wideband precision ranging radar system is designed to accomplish detection and precise range measurement of targets over short ranges at a very low production cost. The radar is limited to measurement of low dynamics targets where range rates should not exceed approximately 5 meters/second. The design uses extraordinarily low radiated emissions power levels to allow very wide bandwidth emissions, facilitating precision ranging, while still meeting Federal Communications Commission (FCC) emissions limits.

The first application of the present invention is a back-up and parking aide ranging system where a vehicle driver is given accurate range information to the nearest object to the driver's vehicle during backup and parking maneuvers. In order to accomplish this, very small targets must be detected and reported to the driver, where "small" targets are those which backscatter only a minuscule portion of the radiated energy which illuminates them. In order to provide useful ranging service to the user with very low power emissions, and to detect very small targets at ranges of up to a few meters, the system incorporates a matched receiver and a continuous wave (CW) waveform, thereby providing the maximum reception efficiency and target detectability allowed by the limited radiation power levels.

A radar system that detects only targets with relative (radial) motion is inherently less expensive than systems that detect targets with no motion. The present low cost radar system detects stationary targets at all ranges of coverage, and the target motion does not distort the range measurement.

The radiated waveform employed in the present invention is a spread spectrum type waveform, accomplished by high speed phase modulation of carriers with pseudo noise or true noise codes. Since the codes are not synchronized between different radar systems, a radar system's receiver is not excited by a different radar system's transmitter. It is the nature of the receiver design that it does not respond to signals other than those modulated by the code of the receiver's radar system. This allows the use of multiple non-interfering radar systems in close proximity to each other without interference or degradation in each radar system's performance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a block diagram of basic radar system in accordance with the principles of the present invention;

FIG. 2 shows a block diagram of a second embodiment of the present radar system that is augmented to include an offset oscillator;

DETAILED DESCRIPTION

Figure 3A:
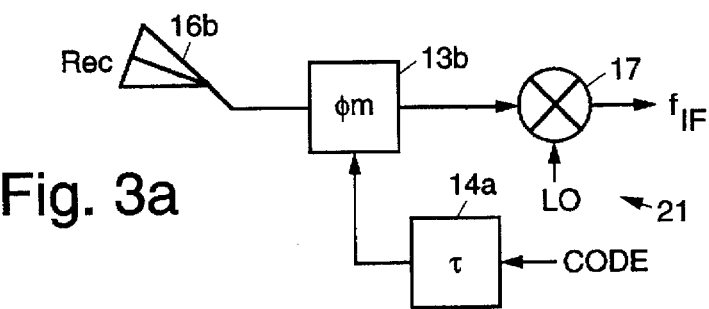
FIGS. 3a and 3b illustrate different types of receiver correlators that may be used in the present radar system.

Referring to the drawing figures, FIG. 1 shows a relatively simple embodiment of a radar system 10 in accordance with the principles of the present invention. The radar system 10 is comprised of a noise code generator 11 for generating a noise code, a data source 12 for generating a data bit stream, a data mixing mechanism 12a for embedding data into the noise code, transmit and receive phase modulators ($\phi_m$) 13a, 13b, a code delay unit ($\tau$) 14, a local oscillator (LO) microwave source 15, transmit (Tx) and receive (Rec) microwave antennas 16a, 16b, a downconverter mixer 17 disposed in the receive signal path, and a baseband integrator and amplifier 19 that is AC coupled to the downconverter mixer 17 by way of a capacitor 18. This radar system 10 is a single range bin radar system 10, wherein a single spherical "shell" of detection sensitivity (range bin) is created. Objects outside the shell are not detected, while objects within the shell are detected. The width of the detection shell (i.e., range bin depth) is determined by the bandwidth of the radiated or transmitted signal. The position of the shell in space, i.e., the distance between the receive antenna 16b and the center of the range bin is determined by a delay parameter "$\tau$". System detection capability, or sensitivity, as a function of angle is provided solely by the radiation patterns of the microwave antennas 16a, 16b.

The microwave antennas 16a, 16b serve to radiate and receive microwave radiation with specified intensity as a function of azimuth and elevation angles of the waveform generated by the code generator 11, data source 12, local oscillator source 15, and transmit phase modulator 13a. The transmit antenna 16a is specified per maximum radiation field intensities allowed by the FCC, while the receive antenna 13b is specified per system sensitivity requirements and detection coverage zone angular selectivity requirements.

The local oscillator source 15 is a fixed frequency microwave signal source with a narrowband (ideally a single frequency) output signal. Data is a predetermined serial bit stream which is recovered as a baseband signal when a target is within the system detection zone as defined by the angular response of the antennas 16a, 16b and the range bin depth and position. The mixing mechanism 12a is a modulo-2 adder, where each bit of the noise code is modulo-2 added (equal to an exclusive OR, or "EXOR", operation) with the data bit stream.

The noise code generator 11 produces a serial bit stream of logic "1's" and "0's" which is a truly random or pseudo random sequence. Each bit in the stream is of the same time duration as all other bits. In the case of a pseudo random code, a bit sequence is produced by the generator 11 which repeats. The sequence of 1's and 0's comprises a "maximal linear code sequence" which is defined as having the following properties.

The number of ones in the sequence is one more than the number of zeros, the statistical distribution of ones and zeros is always the same and is well defined, autocorrelation of a maximal linear code is such that for all values of phase shift the correlation value is −1 except when the phase shift is 0+/−1 bit where the correlation value varies from −1 to a peak (at zero phase shift) of 2n-1, the sequence length, a modulo-2 addition of a maximal linear code with a phase shifted replica results in another replica with a phase shift different from either of the originals, and every possible state, or n-tuple, of a given n stage generator 11 exists at some time during the generation of a complete code cycle. Each state exists for one and only one bit interval. The exception is that the all zeros state never occurs.

In the case of a truly random sequence generator 11, the sequence has the autocorrelation function value of 0 when the phase shift is greater than 1 bit, and maximum when the phase shift is exactly zero. The maximum value of the autocorrelation function is ideally infinity, and in practice is limited by either correlation time or hardware dynamic range.

Figure 7:
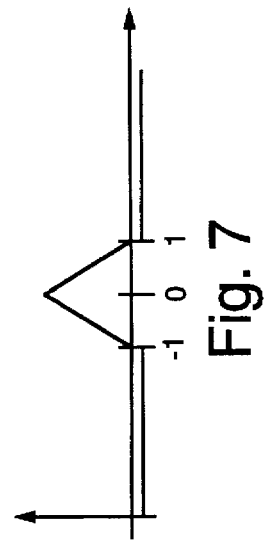
FIG. 7 shows an autocorrelation function of a PN maximal code bit stream.

The required property of the output of the noise code generator 11 is that the autocorrelation function of the bit stream is very small relative to the maximum value when the correlation delay is greater than one bit, and a maximum for zero delay. The autocorrelation function of a pseudo random (PN) maximal code is shown in FIG. 7.

The output of the delay unit 14 is a bit sequence that is a replica of its input sequence delayed by a specified amount, t nanoseconds. In general, the delay unit 14 has a programmable value for t, where the available values are integer multiples of the input bit stream bit duration, plus a fixed offset. In the basic single range bin radar system 10 of FIG.

1, the delay unit 14 has a fixed delay. In general, the delay unit 14 may have its delay parameter τ fixed at any value, or programmable to any value, depending on the desired range coverage and resolution for the radar system 10.

The phase modulators ($\phi_m$) 13a, 13b modulate the LO signal according to the input bit stream to the modulators 13a, 13b. In the system 10 of FIG. 1, a binary bit stream is employed, wherein the phase modulators 13a, 13b are binary phase modulators. When the input bit is a logic "1", the LO signal is passed through the modulators 13a, 13b unchanged. When the input logic bit is a "0", the output of the modulators 13a, 13b is a replica of the LO signal but 180° out of phase with the LO signal. Each modulator 13a, 13b converts its input bit stream into a sequence of LO signals that have phase inversions every time the input bit stream has a state change.

The baseband integrator and amplifier 19 amplifies small signals that emanate from the downconverter mixer 17 in the receiver path. When the received signal and the phase modulated LO signal mix and are synchronized in time, the data bit stream emerges from the mixer. The integrator and amplifier 19 is designed to amplify the data bit stream or certain harmonics of the data bit stream. The presence of the data bit stream at the mixer output, and its amplified replica or one of its amplified harmonics indicates the presence of a target in the detection zone.

The principles of operation for the basic system 10 will now be discussed. Two signals are simultaneously generated by the system 10, which are a transmit signal and a reference signal. The transmit signal is the signal radiated from the transmit antenna 16a and is generated by bi-phase modulating the carrier (LO) with the noise code modulo-2 added to the data stream. The reference signal is generated by bi-phase modulating the carrier with a delayed replica of the noise code.

The downconverter mixer 17, baseband integrator and amplifier 19 together form a correlator 21, with the reference signal and the returned receive signal as inputs. The code is delayed by a prescribed amount in the delay unit 14 with respect to the code that modulates the transmitted LO signal. The received signal is scattered off a target at some distance from the radar system 10, and therefore has been delayed with respect to the transmit reference signal by a time given by $$\tau_R = 2R/c,$$

where R is the range to the target, and c is the speed of light, and $\tau_R$ is the range delay.

When $\tau_R$ matches the applied time delay τ from the delay unit 14, the output from the downconverter mixer 17 and baseband amplifier 19, which form the correlator 21, becomes large as shown in FIG. 7. Whenever the target range delay is within one noise code bit length (chip) relative to the reference code delay τ, the output from the correlator 21 increases above its minimum value. For simplicity, the discussion presumes no delay in any electronic circuit except the desired delay in the delay unit 14. Practical circuits with various nonzero delays introduce a delay offset in the system 10 which is fixed and independent of the target delay or the programmed code delay.

Since the received signal has the data stream mixed in with its pseudo noise (PN) code, and the reference signal (carrier modulated by the delayed code) does not, when the two are in time synchronization, or nearly so, the data stream emerges from the downconverter mixer 17. This structure is known as a "heterodyne correlator".

The data stream in this system 10 is introduced to relax the baseband detection requirement in practical circuits. If there were no data stream, a DC signal would emerge form the downconverter mixer 17 when the input and reference signals are time synchronized, or nearly so. The DC signal would increase as synchronization becomes more exact as shown in FIG. 7, indicating the presence of a target. In theory, a DC amplifier would be used to amplify the output of the correlator 21. In practical circuits, this DC signal is forced to compete with DC offsets and circuit bias drift which are unavoidable. The data stream, rich in AC signal components of known frequencies, is introduced as a baseband signal to provide a unique signal that is more easily amplified and detected than a DC baseband signal. The autocorrelation function shown in FIG. 7 corresponds to the amplitude of the data output (hence each of its AC components) from the baseband integrator and amplifier 19.

Enhancements to the basic system 10 will now be discussed. As stated with reference to the discussion of FIG. 1, the basic system 10 has a characteristic wherein the baseband signal will "dropout" due to the lack of a "quadrature LO" signal. Because the system 10 uses coherent homodyne downconversion, if the carrier phase of the return signal happens to be in quadrature with the reference carrier (LO), the output of the correlator 21 is zero even though the noise codes may be perfectly time synchronized. The range delay of the target causes a phase lag in the return signal carrier given by $$\phi_R = 2\pi(2R/\lambda)$$

Figure 8:
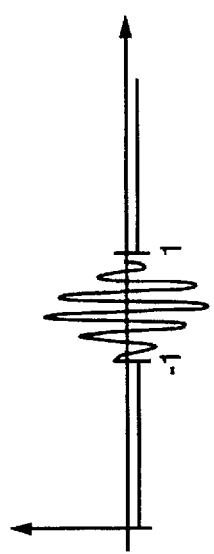
FIG. 8 shows the output as a function of target range or range delay for the system of FIG. 1.

(where λ is the carrier wavelength) with respect to the reference carrier. Depending on the range of the target, this phase may be any value. The return signal then may be in quadrature with the reference carrier, or exactly in phase, or somewhere in between, depending on the range of the target. Every quarter wavelength change in target range brings the output of the correlator 21 from a peak through a null back to a peak, (or from a null through a peak to a null, or some other similar amplitude excursion). FIG. 8 shows the amplitude of the baseband signal at the baseband amplifier output as a function of target range, using a pseudo noise code as an example; the carrier is higher in frequency than the code rate for this example. As is shown in FIG. 8, the system response undergoes peaks and nulls for small changes in target range when the target is within the range bin.

Amplitude variations in the basic system 10 may be eliminated in a number of ways, a few of which are described below. Referring to FIG. 2, it shows a radar system 10a that includes an offset oscillator 22 to shift the carrier frequency of the reference signal with respect to the return signal. A splitter 26 and a second mixer 27 are employed to mix the signals from the local oscillator source 15 and offset oscillator 22. The transmitted and returned signal does not have its noise code added to a data stream in this case, because this is unnecessary. When the target has a range such that the return and reference codes have the same delay (or nearly so), the downconverter mixer 17 outputs a continuous wave at a frequency that is the difference between the transmit carrier and the reference carrier. This difference frequency is equal to the frequency of the offset oscillator 22. Since the output of the correlator 21 in this case is an AC signal, the data stream is not introduced. There is no amplitude null within the correlation delay interval of +/−1 code bit since the reference and return carriers, albeit phase coherent, have a frequency offset as opposed to a target range dependent phase offset. The baseband amplifier 19 is coupled to a bandpass filter (BPF) 23 that is centered at the frequency of the offset oscillator 22, followed by a detector 24. The DC output of the detector 24 is as shown in FIG. 7 as a function of target range delay, using a pseudo noise code for example. When the detector 24 exceeds threshold, $V_{th}$, a threshold comparator 25 changes logic state to indicate the presence of a target within the single range bin.

Figure 5A:
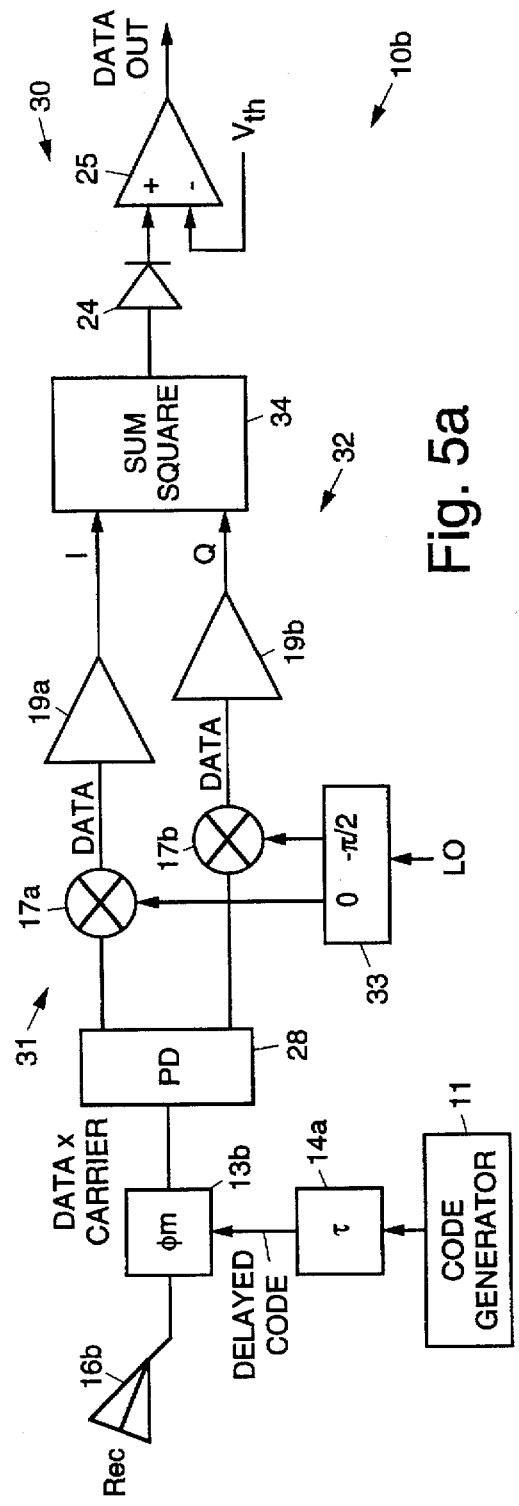
FIGS. 5a and 5b show quadrature receiver structures that employ in-line and heterodyne correlators that are used when an offset oscillator is not used.

Yet another implementation that eliminates periodic null/peak amplitude system output is to use an I/Q receiver 30 including two downconversion channels 31, 32. In addition to the use of an "in-phase" channel 31 such as is shown in FIG. 1, a "quadrature" reference channel 32 is formed as shown in FIG. 5a. A power divider (PD) 28 is used to couple the data and carrier signal to the respective channels 31, 32. The local oscillator signal (LO) is coupled to I and Q downconverter mixer 17a, 17b by way of a power divider having 90 degree out of phase output ports 33. Outputs of baseband integrator and amplifier 19a, 19b of the respective channels 31, 32 are processed 34 (squared and summed) to produce a root sum square amplitude which is passed through the detector 24 and threshold comparator 25 to generate a signal that indicates the presence of a target.

Figure 5B:
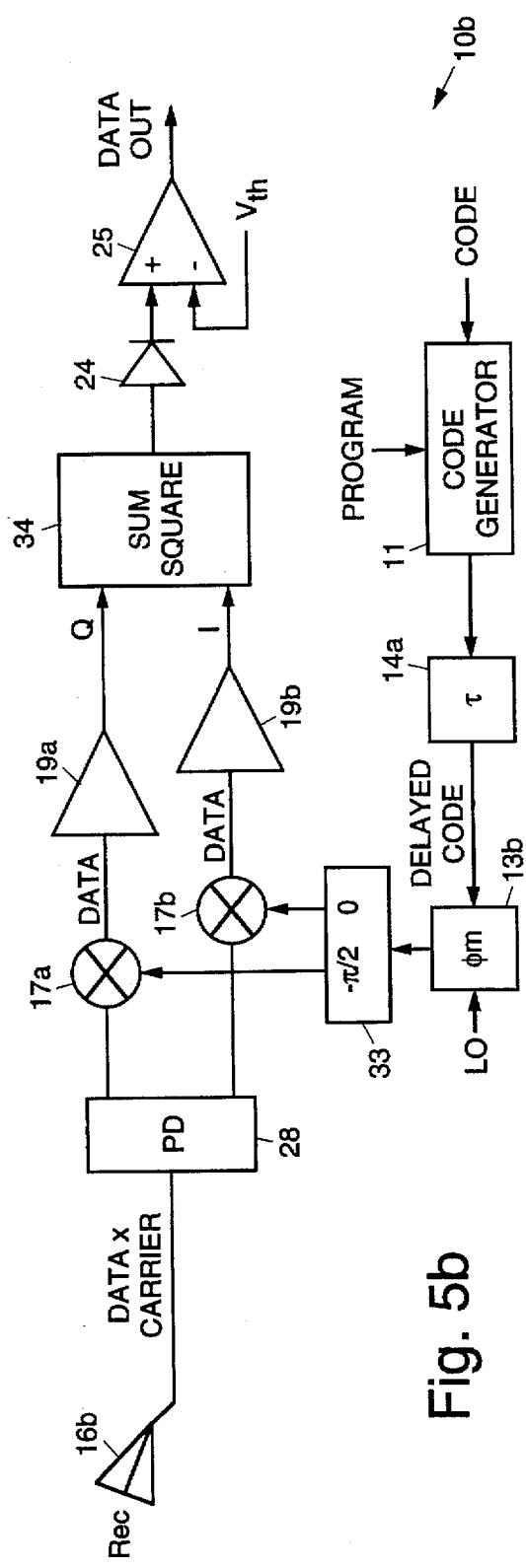

FIG. 5b shows an extension of the concept in FIG. 1, where an I/Q heterodyne correlator is implemented. Only the receiver correlator sections are shown in FIGS. 5a and 5b. When the reference and return carriers are in phase quadrature, the return carrier is in phase with the quadrature reference, whose correlator then has a maximum output amplitude allowed by the envelope of the noise code autocorrelation function. The root sum square amplitude of the baseband I and Q channels 31, 32 follows the autocorrelation curve of FIG. 7 as a function of target range delay, with no nulls when the target is within the range bin.

By individually processing the baseband I and Q channels, both the direction and rate of target radial motion may be determined. Processing includes mixing the baseband signals with the data signal or a harmonic thereof to directly extract any Doppler frequencies in the baseband, then filtering with a Kalmus filter or digitizing the I and Q Doppler channels.

Figure 3B:
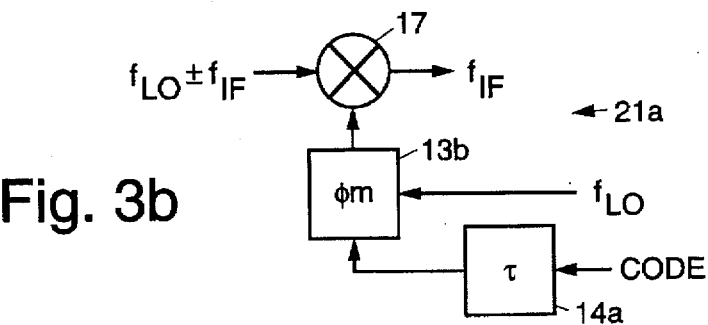

Different configurations for the correlator 21 employed in the present radar system may be used. For example, cost savings may be realized by replacing the heterodyne correlator 21 shown in FIG. 3a with an in-line correlator 21a shown in FIG. 3b. FIG. 5 shows both in-line (FIG. 5a) and heterodyne (FIG. 5b) I/Q correlators 21, 21a. Both receiver correlators 21, 21a work well, but the heterodyne correlator 21 has higher resistance to interference signals.

In order to effect a baseband signal with AC components, the transmit carrier may be modulated by numerous ways prior to noise encoding. Either digital or analog waveforms may be used to amplitude modulate or angle modulate or combination modulate the transmit carrier prior to noise encoding. The noise encoding may be multi-phase modulation, binary phase modulation, or amplitude modulation. However, the present invention is limited to direct sequence modulation, as opposed to frequency hopping or chirp systems.

The AC baseband implementation in all of the systems 10 described herein is achieved by exclusively ORing the data stream (modulo-2 addition) with the noise code and exemplifies the simplicity of this implementation (use of one EXOR gate). The data may be added in this manner to either a PN code or a true noise code. The data stream need not be a square wave; it may be any unique or recognizable bit sequence which serves to enhance detection or enhance interference rejection.

The delay functions shown in FIGS. 1 through 4 imply a fixed delay through which the reference signal noise code is transferred, creating a single range bin system 10. The system 10 may be programmable in either an analog or digital implementation. By making the system 10 programmable, where the delay imparted to the noise code is under electronic control, a multiplicity of range bins may be effected. This programmability is shown in FIG. 5 in both the in-line and heterodyne correlators 21, 21a. Analog delay units 14 may be comprised of a system of signal paths of varying lengths and switches which switch in different delays. If analog delay units 14 are used, the "noise code" need not be a discrete bit stream, but may be as general as any random waveform capable of modulating the carrier such that the radiated emission is a spread spectrum.

Digital delay units 14 utilize discrete logic signals as inputs and outputs, and may be realized in various ways. The digital delay unit 14 incorporated into a field test system 10 (FIG. 4) was a cascade of D-type flip flops, where each output is sent through an n:1 multiplexer, thus providing for shifting the delay precisely one code bit. Delay shift precision in this scheme is accomplished since the D-type flip flops are clocked simultaneously by a code generator clock.

Figure 4:
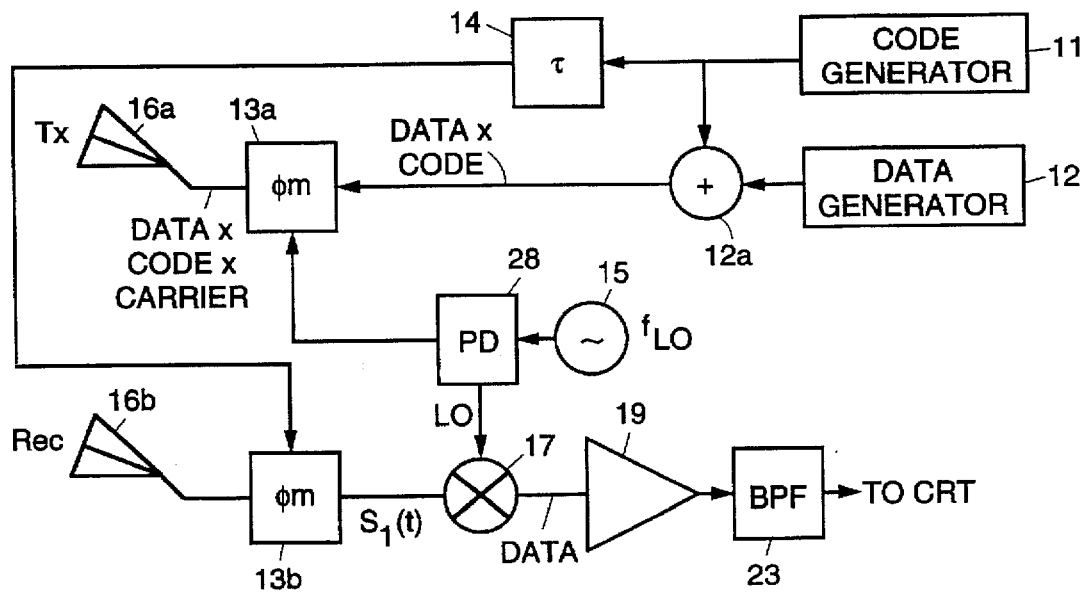
FIG. 4 is a block diagram of a radar system that was built and field tested.

The system 10 that was constructed to verify that system concept and study how the wideband waveform interacts with real world targets is shown in FIG. 4. This test system 10 uses only one receiver channel and no offset oscillator for simplicity. The baseband section extracts and amplifies the fundamental harmonic of the data waveform, which is a 10 KHz square wave. The in-line modulator was selected for simplicity. Field data showed a system response as predicted in FIG. 8 even when targets of significant range depth extent were used.

Figure 6:
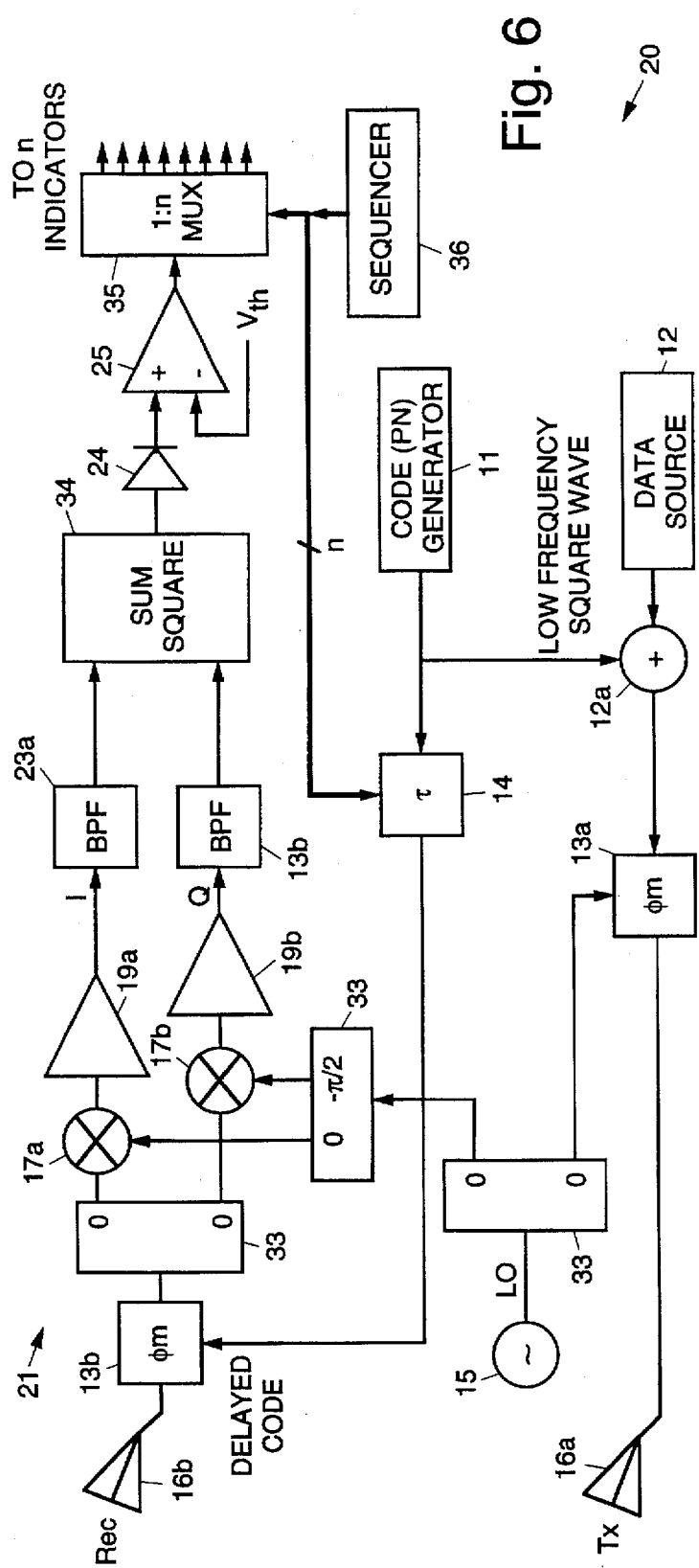
FIG. 6 shows a block diagram of a radar system including an I/Q receiver instead of an offset oscillator, and illustrates the concept of continually changing range gate delay in a cyclical manner, while multiplexing an appropriate indicator for each range bin, to cover a multiplicity of range bins.

The system 10 of FIG. 6 is intended for use as a parking aide and/or backup ranging radar system 10 for vehicle applications. This system 10 uses an I/Q in-line correlator 21, a square wave data stream derived from the data source 12 is EXOR'd with a pseudo noise code modulating the transmit waveform generated by the code generator 11, and a baseband section that extracts the fundamental harmonic of the data waveform. The I and Q channels are squared then summed 34 for continuous detection throughout the range bin. A programmable digital delay unit 14 controlled by a sequencer 36 is used to sequentially change the position of the range bin. This system 10 continuously steps the range bin through adjacent positions, dwelling in each position long enough to adequately test for target detection, and activates an indicator (driven by a multiplexer 35) associated with each range bin if a target is present in the range bin. Thus, any desired region of range coverage, with precision range resolution, may be accomplished. The rate at which the range bins positions may be scanned is governed by the response time (bandwidth) of the baseband amplifier and detector. The programmable delay unit 14 is changed in one chip (noise code bit) intervals, using digital flip flops as delay elements, setting up a bank of overlapping detection correlation responses (FIG. 7), the peaks of which are separated by precisely one chip time.

Thus, continuous wave wideband precision ranging radar systems have been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

The embodiments of the invention in which an exclusive property or privilege is claimed are defined as follows:

1. A continuous wave wideband precision ranging radar system comprising:

a noise code generator for generating a noise code;

a data source for generating a data bit stream;

a mixer for embedding said data bit stream into the noise code;

a local oscillator microwave source for generating a local oscillator signal;

a transmit phase modulator for modulating the local oscillator signal according to the data bit stream to produce a modulated local oscillator signal;

a transmit microwave antenna for transmitting the modulated local oscillator signal;

a receive microwave antenna for receiving the modulated local oscillator signal reflected from a target;

a code delay for delaying the noise code;

a receive phase modulator for modulating the local oscillator signal according to the delayed noise code; and a correlator for correlating the delayed code and the received modulated local oscillator signal reflected from the target, whereby said correlator outputs said data bit stream when the target is within a detection zone defined by said code delay, substantially independent of a motion of said target with respect to said radar system.

2. The system of claim 1 wherein the correlator comprises a heterodyne correlator.

3. The system of claim 1 wherein the correlator comprises an in-line correlator.

4. The system of claim 1 wherein the correlator comprises a I/Q in-line correlator.

5. The system of claim 1 wherein the correlator comprises:

a downconverter mixer coupled to the receive microwave antenna and to the receive phase modulator; and a baseband integrator and amplifier coupled to the downconverter mixer for outputting data from the radar system.

6. The system of claim 1, wherein the data bit stream has a fundamental harmonic frequency, and the correlator comprises:

a down converter mixer coupled to the receive microwave antenna and to the receive phase modulator; and an amplifier and band pass filter coupled to the down converter mixer, the band pass filter being tuned to extract said an output signal at said fundamental harmonic frequency when the target is within said target range bin.

7. A continuous wave wideband precision ranging radar system comprising:

a noise code generator for generating a noise code;

a local oscillator microwave source for generating a local oscillator signal;

a transmit phase modulator for modulating the local oscillator signal according to the noise code to produce a modulated local oscillator signal;

a transmit microwave antenna for transmitting the modulated local oscillator signal;

a receive microwave antenna for receiving the modulated local oscillator signal reflected from a target;

a code delay for delaying the noise code;

an offset oscillator for generating an offset oscillator signal;

a mixer for mixing the local oscillator signal and the offset oscillator signal to form a reference carrier signal;

a receive phase modulator for modulating the reference carrier signal according to the delayed noise code; and a correlator for correlating the modulated reference carrier signal and the received modulated local oscillator signal reflected from the target, whereby said correlator outputs a signal at the frequency of said offset oscillator signal when the target is within a detection zone defined by said code delay, substantially independent of a motion of said target with respect to said radar system.

* * * * *